US012694368B2

(12) United States Patent　　(10) Patent No.:　US 12,694,368 B2
Uchimura et al.　　(45) Date of Patent:　Jul. 28, 2026

(54) MANAGEMENT APPARATUS, MANAGEMENT SYSTEM, AND MANAGEMENT METHOD

(71) Applicant: NEC Corporation, Tokyo (JP)

(72) Inventors: Jun Uchimura, Tokyo (JP); Hiroki Sugegaya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 334 days.

(21) Appl. No.: 18/031,221

(22) PCT Filed: Oct. 20, 2020

(86) PCT No.: PCT/JP2020/039415
§ 371 (c)(1),
(2) Date: Apr. 11, 2023

(87) PCT Pub. No.: WO2022/085081
PCT Pub. Date: Apr. 28, 2022

(65) Prior Publication Data
US 2023/0385757 A1　　Nov. 30, 2023

(51) Int. Cl.
*G06Q 10/087*　　(2023.01)
(52) U.S. Cl.
CPC ................................. *G06Q 10/087* (2013.01)
(58) Field of Classification Search
CPC ............................. G06Q 10/087; G06Q 50/10
See application file for complete search history.

(56) References Cited

U.S. PATENT DOCUMENTS

| | | | |
|---|---|---|---|
| 2019/0025849 A1* | 1/2019 | Dean .................... | G06Q 10/087 |
| 2020/0050813 A1 | 2/2020 | Bonner et al. | |
| 2020/0402429 A1* | 12/2020 | Cho .................... | G06Q 20/208 |
| 2021/0225134 A1 | 7/2021 | Mori et al. | |

FOREIGN PATENT DOCUMENTS

| | | | |
|---|---|---|---|
| JP | 2000-250497 | A | 9/2000 |
| JP | 2000250497 | * | 9/2000 |
| JP | 2007-328721 | A | 12/2007 |
| JP | 2008-136538 | A | 6/2008 |
| JP | 2009-172274 | A | 8/2009 |
| JP | 2011-039907 | A | 2/2011 |
| JP | 2014-048752 | A | 3/2014 |
| JP | 2014-179020 | A | 9/2014 |
| WO | 2019/230925 | A1 | 12/2019 |

OTHER PUBLICATIONS

International Search Report for PCT Application No. PCT/JP2020/039415, mailed on Dec. 22, 2020.
JP Office Action for JP Application No. 2022-556863, mailed on Nov. 14, 2023 with English Translation.

* cited by examiner

*Primary Examiner* — Florian M Zeender
*Assistant Examiner* — Kimberly S. Bursum
(74) *Attorney, Agent, or Firm* — Sughrue Mion, PLLC

(57)　　ABSTRACT

A burden on a user when confirming whether product information is correctly registered in an electronic shelf label (102) is reduced. A management system (100) includes: a plurality of the electronic shelf labels (102) and a management apparatus (103). The management apparatus (103) includes an inquiry unit (114) that transmits inquiry information including first product identification information to the plurality of electronic shelf labels (102), and a notification control unit (117) that performs control for notifying a user, based on reply data from the plurality of electronic shelf labels (102) in response to the inquiry information.

5 Claims, 20 Drawing Sheets

Figure 5:
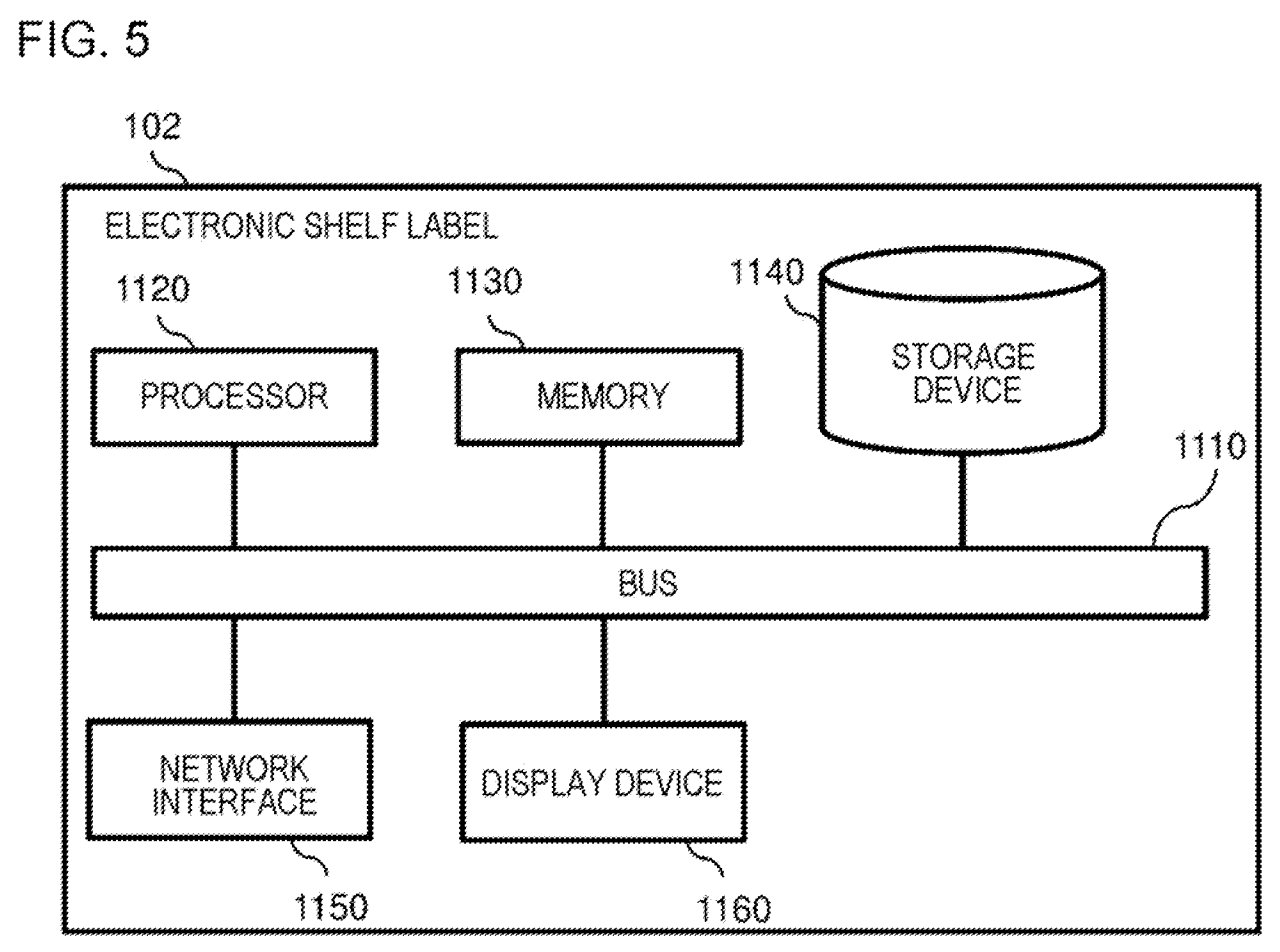

102 — ELECTRONIC SHELF LABEL

1120 — PROCESSOR

1130 — MEMORY

1140 — STORAGE DEVICE

1110 — BUS

1150 — NETWORK INTERFACE

1160 — DISPLAY DEVICE

PRODUCT MANAGEMENT INFORMATION

120a

| PRODUCT ID | PRODUCT NAME | PRICE | SHELF LABEL ID |
|---|---|---|---|
| 001 | PRODUCT A | 100 | |
| 002 | PRODUCT B | 300 | |
| 003 | PRODUCT C | 250 | |
| 004 | PRODUCT D | 150 | |

PRODUCT MANAGEMENT INFORMATION

| PRODUCT ID | PRODUCT NAME | PRICE | SHELF LABEL ID |
|------------|--------------|-------|----------------|
| 001 | PRODUCT A | 100 | ESL1 |
| 002 | PRODUCT B | 300 | ESL2 |
| 003 | PRODUCT C | 250 | ESL3 |
| 004 | PRODUCT D | 150 | ESL4 |

110b_1

SHELF LABEL PRODUCT
INFORMATION

| PRODUCT ID | 002 |
|---|---|
| PRODUCT NAME | PRODUCT B |
| PRICE | 300 |

PRODUCT MANAGEMENT INFORMATION

| PRODUCT ID | PRODUCT NAME | PRICE | SHELF LABEL ID |
|------------|--------------|-------|----------------|
| 001 | PRODUCT A | 100 | ESL1 |
| 002 | PRODUCT B | 300 | |
| 003 | PRODUCT C | 250 | ESL3 |
| 004 | PRODUCT D | 150 | ESL4 |

MANAGEMENT APPARATUS, MANAGEMENT SYSTEM, AND MANAGEMENT METHOD

This application is a National Stage Entry of PCT/JP2020/039415 filed on Oct. 20, 2020, the contents of all of which are incorporated herein by reference, in their entirety.

TECHNICAL FIELD

The present invention relates to a management apparatus, a management system, a management method, and a program.

BACKGROUND ART

An electronic shelf label is being generally utilized in a store such as a supermarket and a convenience store. The electronic shelf label is arranged in association with a product displayed on a product shelf or the like, and displays product information of the associated product.

For example, PTL 1 discloses a technique for changing product information to be displayed on an electronic shelf label (ESL) 40 by an ESL server 10 that centrally manages information on a plurality of products handled in a store.

RELATED DOCUMENT

Patent Document

[PTL 1] Japanese Patent Application Publication No. 2014-179020

SUMMARY OF THE INVENTION

Technical Problem

Incidentally, generally, a plurality of electronic shelf labels are mostly installed in a store, and products to be handled and a display method thereof are also varied. Thus, there is a risk that product information is erroneously registered in an electronic shelf label.

It is assumed that, as to presence or absence of erroneous registration, product information displayed on an electronic shelf label is visually confirmed by a user such as a store clerk, but a burden thereof is great.

In particular, it is considered that, as the number of electronic shelf labels installed in a store is larger, both a risk of erroneously registering product information in an electronic shelf label, and a burden for confirmation thereof are greater.

The present invention has been made in view of the circumstances described above, and one of objects thereof is to reduce a burden on a user when confirming whether product information is correctly registered in an electronic shelf label.

Solution to Problem

In order to achieve the above object, a management apparatus according to a first aspect of the present invention includes:

an inquiry means for transmitting inquiry information including first product identification information to a plurality of electronic shelf labels; and a notification control means for performing control for notifying a user, based on reply data from the plurality of electronic shelf labels in response to the inquiry information.

A management system according to a second aspect of the present invention includes:

a plurality of electronic shelf labels with each of which a product is associated; and a management apparatus that manages the plurality of electronic shelf labels, wherein the management apparatus includes an inquiry means for transmitting inquiry information including first product identification information to a plurality of electronic shelf labels, and a notification control unit that performs control for notifying a user, based on reply data from the plurality of electronic shelf labels in response to the inquiry information, and each of the plurality of electronic shelf labels includes a shelf label product storage means for storing product identification information of a product to be associated, and a shelf label communication means for transmitting reply data when the inquiry information is received.

A management method according to a third aspect of the present invention includes:

transmitting inquiry information including first product identification information to a plurality of electronic shelf labels; and performing control for notifying a user, based on reply data from the plurality of electronic shelf labels in response to the inquiry information.

A program according to a fourth aspect of the present invention causes a computer to execute:

transmitting inquiry information including first product identification information to a plurality of electronic shelf labels; and performing control for notifying a user, based on reply data from the plurality of electronic shelf labels in response to the inquiry information.

Advantageous Effects of Invention

According to the present invention, it becomes possible to reduce a burden on a user when confirming whether product information is correctly registered in an electronic shelf label.

BRIEF DESCRIPTION OF THE DRAWINGS

FIG. 1 is a diagram illustrating a configuration of a management system according to one example embodiment of the present invention.

FIG. 4 is a diagram illustrating a physical configuration of the management apparatus according to the present example embodiment.

FIG. 5 is a diagram illustrating a physical configuration of the electronic shelf label according to the present example embodiment.

FIG. 6 is a diagram illustrating a physical configuration of a terminal apparatus according to the present example embodiment.

FIG. 8 is a diagram illustrating one example of product management information in a state where a shelf label ID is not set.

FIG. 9 is a diagram illustrating one example of product management information when a product and a shelf label are correctly associated with each other.

FIG. 11B is a flowchart illustrating one example of the management method according to one example embodiment of the present invention.

FIG. 12 is a diagram illustrating one example of product management information when a product and a shelf label that are erroneously associated with each other are included.

DESCRIPTION OF EMBODIMENTS

Figure 2:
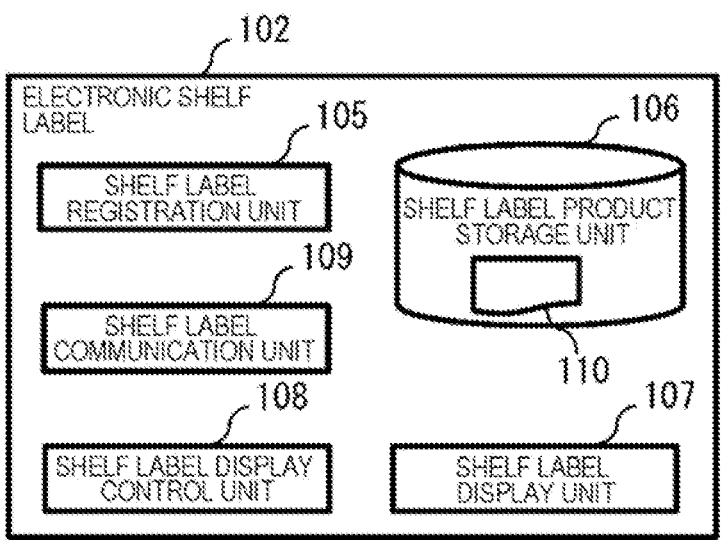
FIG. 2 is a diagram illustrating a functional configuration of an electronic shelf label according to the present example embodiment.

Hereinafter, an example embodiment of the present invention is described by use of the drawings. Note that, in all of the drawings, a similar component is assigned with a similar reference sign, and description thereof is omitted, as appropriate.

<Configuration of Shelf Label Management System 100>

Figure 1:
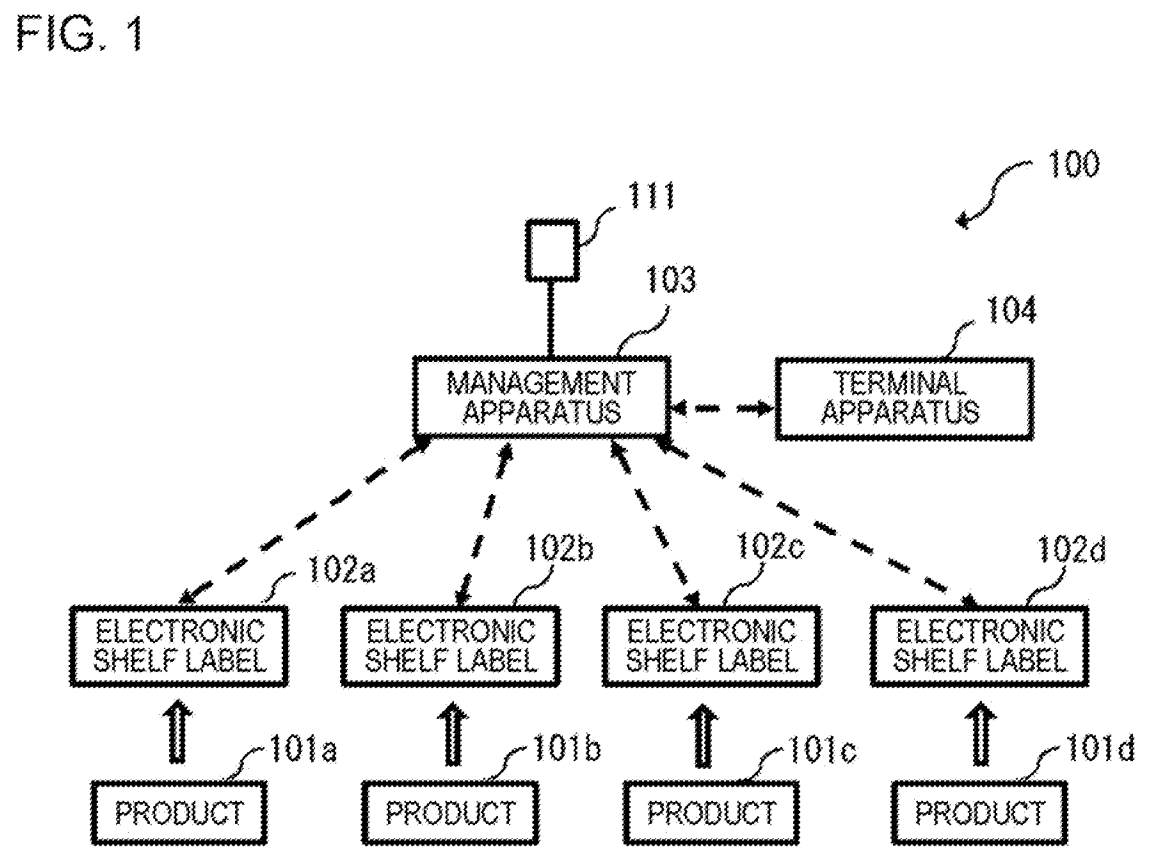

As illustrated in FIG. 1, a management system 100 according to one example embodiment of the present invention is a system for managing first to fourth products 101*a* to 101*d* and first to fourth electronic shelf labels 102*a* to 102*d* in a store such as a supermarket and a convenience store.

The management system 100 includes the first to fourth electronic shelf labels 102*a* to 102*d* that are each associated with each of the first to fourth products 101*a* to 101*d*, a management apparatus 103 that manages the first to fourth electronic shelf labels 102*a* to 102*d*, and a terminal apparatus 104.

The management apparatus 103 and each of the first to fourth electronic shelf labels 102*a* to 102*d* each transmit and receive information to and from each other by, for example, wireless communication such as Bluetooth. Moreover, the management apparatus 103 and the terminal apparatus 104 transmit and receive information to and from each other via a wired or wireless network, or a network combining wire and wireless. Note that, the management apparatus 103 and the first to fourth electronic shelf labels 102*a* to 102*d* may transmit and receive information to and from each other by wired communication or by communication combining wireless and wire.

In the following, the first to fourth products 101*a* to 101*d* are also simply referred to as products 101*a* to 101*d*, respectively, and the products, when not particularly distinguished, are also simply referred to as a "product 101". Moreover, the first to fourth electronic shelf labels 102*a* to 102*d* are also simply referred to as electronic shelf labels 102*a* to 102*d*, respectively, and the electronic shelf labels, when not particularly distinguished, are also simply referred to as an "electronic shelf label 102".

Note that, the number of the products 101*a* to 101*d* handled in a store is not limited to four, and may be plural, and the number of electronic shelf labels 102*a* to 102*d* to be each associated with each of the products 101*a* to 101*d* may be also plural.

<Functional Configuration of Electronic Shelf Label 102>

The electronic shelf label 102 is registered product information of the product 101 associated with each of the electronic shelf labels 102, and is attached to a fixture in which the product 101 is displayed. For attachment to a fixture, the electronic shelf label 102 is generally arranged in a vicinity of the relevant product 101. Then, the electronic shelf label 102 displays a part or all of the product information of the registered product 101.

Functionally, as illustrated in FIG. 2, each of the electronic shelf labels 102 includes a shelf label registration unit 105, a shelf label product storage unit 106, a shelf label display unit 107, a shelf label display control unit 108, and a shelf label communication unit 109.

The shelf label registration unit 105 registers a product identifier (ID) of a product being associated with the electronic shelf label 102 including itself.

A product ID is product identification information for identifying a product, and differs for each product type to be determined by, for example, a product name of the product 101.

The shelf label product storage unit 106 is a storage unit for storing shelf label product information 110.

The shelf label product information 110 is product information being information relating to the product 101 to be associated with the electronic shelf label 102 in which the shelf label product information 110 is stored. The shelf label product information 110 is stored in the shelf label product storage unit 106 by the shelf label registration unit 105.

The shelf label product information 110 according to the present example embodiment includes a product ID and detailed information of the product 101, as product information of the product 101 to be associated with the electronic shelf label 102 in which the shelf label product information 110 is stored.

Detailed information is information excluding a product ID from product information of a product being relevant to the product ID. The detailed information included in the shelf label product information 110 is a product name and a price of the product 101 to be associated with the electronic shelf label 102 (e.g., refer to FIG. 10A).

The shelf label display unit 107 displays previously determined product information and the like.

The shelf label display control unit 108 controls the shelf label display unit 107. For example, the shelf label display control unit 108 causes the shelf label display unit 107 to display previously determined information among pieces of the shelf label product information 110 stored in the shelf label product storage unit 106.

In the present example embodiment, the shelf label display control unit 108 displays a product name and a price of a product as previously determined product information.

When the shelf label communication unit 109 receives an inquiry (inquiry information) relating to the registered product 101 from the management apparatus 103, the shelf label communication unit 109 generates and transmits reply data.

Specifically, when the shelf label communication unit 109 receives an inquiry, the shelf label communication unit 109 refers to the shelf label product information 110 stored in the electronic shelf label 102 including the shelf label communication unit 109. The shelf label communication unit 109 generates reply data when the inquiry is an inquiry concerning a product ID (i.e., a product being associated with the electronic shelf label 102) included in the shelf label product information 110, and transmits the reply data to the management apparatus 103.

The reply data according to the present example embodiment include detailed information included in the shelf label product information 110.

<Functional Configuration of Management Apparatus 103>

The management apparatus 103 manages the products 101a to 101d and the electronic shelf labels 102a to 102d. The management apparatus 103 may be a dedicated apparatus, or may be an apparatus that manages a point of sales (POS) terminal installed in a store.

Figure 3:
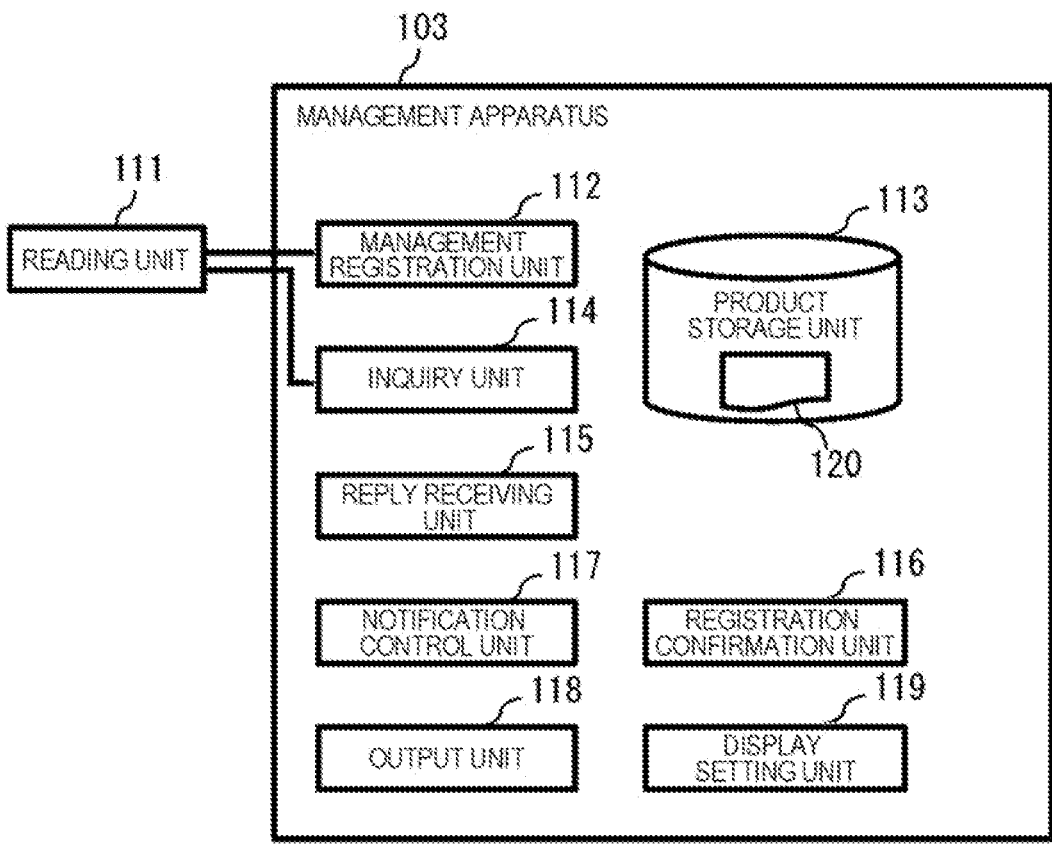
FIG. 3 is a diagram illustrating a functional configuration of a management apparatus according to the present example embodiment.

Functionally, as illustrated in FIG. 3, the management apparatus 103 includes a reading unit 111, a management registration unit 112, a product storage unit 113, an inquiry unit 114, a reply receiving unit 115, a registration confirmation unit 116, a notification control unit 117, an output unit 118, and a display setting unit 119.

The reading unit 111 is equipment that reads codes provided on the product 101 and the electronic shelf label 102, and is, for example, a scanner or the like.

The code is a barcode, a two-dimensional code, or the like. The code provided on the product 101 includes a product ID. The code provided on the electronic shelf label 102 includes a shelf label ID.

The shelf label ID is information (i.e., shelf label identification information) for identifying each of the electronic shelf labels 102. For the shelf label ID, for example, any of a serial number of the electronic shelf label 102, an ID individually assigned to the electronic shelf label 102 at a store, and the like may be adopted.

The management registration unit 112 registers the electronic shelf label 102 in association with the product 101, based on read information that can be acquired by the reading unit 111 by reading a code.

The product storage unit 113 is a storage unit for storing product management information 120 for managing the product 101 in a store.

The product management information 120 is information in which the product information is related to the shelf label ID of the electronic shelf label 102 being associated with the product 101, for each of the products 101.

The product management information 120 according to the present example embodiment includes a product ID and detailed information as product information, and the detailed information includes a product name and a price (e.g., refer to FIG. 9). The product management information 120 is stored in the product storage unit 113 by the management registration unit 112.

The inquiry unit 114 transmits inquiry information including a product ID to a plurality of the electronic shelf labels 102.

Specifically, the inquiry unit 114 transmits inquiry information including a product ID (first product identification information) of one of the products 101 to each of the plurality of electronic shelf labels 102. Further, the inquiry unit 114 transmits inquiry information including the product ID (product identification information) of at least one of the products 101 differing from the first product identification information to each of the plurality of electronic shelf labels 102.

In the present example embodiment, the inquiry unit 114 transmits inquiry information including each product ID of the products 101a to 101d to all of the plurality of electronic shelf labels 102.

The reply receiving unit 115 receives reply data from the electronic shelf label 102 as a response to inquiry information transmitted by the inquiry unit 114.

The registration confirmation unit 116 confirms, based on the reply data from the plurality of electronic shelf labels 102 received by the reply receiving unit 115, whether there is an error in the association between the product 101 stored in the product management information 120 and the electronic shelf label 102.

The notification control unit 117 performs control for notifying a user, based on the reply data from the plurality of electronic shelf labels 102 received by the reply receiving unit 115.

In the present example embodiment, the notification control unit 117 performs control for notifying a user, based on a result of confirmation in the registration confirmation unit 116.

Specifically, the notification control unit 117 receives reply data from the plurality of electronic shelf labels 102 for an inquiry. The notification control unit 117 determines, based on the received reply data, whether there is an abnormality in the reply data, and performs control for issuing a warning to a user when there is an abnormality in the reply data.

The following three cases can be given as examples of abnormalities.

A first case of an abnormality is that reply data indicating that a product ID of certain product 101 is registered are not received from the plurality of electronic shelf labels 102.

A second case of an abnormality is that reply data indicating that a product ID of certain product 101 is registered are received from the plurality of electronic shelf labels 102.

A third case of an abnormality is that detailed information included in reply data includes information that does not match detailed information being related to a product ID in the product management information 120. Such an abnormality may occur, for example, due to a communication error or the like when the shelf label product information 110 of the electronic shelf label 102 is updated by wireless communication.

Herein, the warning is a notification when there is an abnormality.

In the present example embodiment, the notification control unit 117 causes the electronic shelf label 102 to notify, by transmitting notification information for a notification to the electronic shelf label 102. The notification is performed, for example, by display of the shelf label display unit 107 of the electronic shelf label 102.

When the notification in a normal case (i.e., when there is no abnormality) is performed, a notification is preferably performed in a differing mode, such as changing a color of display, between a notification in a normal case and a notification in a case where there is an abnormality. Moreover, when there are abnormalities in differing modes such as first to third cases, it is preferable to notify in a differing mode, depending on a mode of an abnormality.

The output unit 118 outputs information to the terminal apparatus 104 by communication.

Specifically, when there is an abnormality regarding reply data in response to an inquiry relating to any of product IDs, the output unit 118 outputs error information indicating the product 101 being related to the abnormality.

The display setting unit 119 performs setting relating to display on each of the electronic shelf labels 102.

Specifically, when there is an abnormality regarding reply data in response to an inquiry relating to any of product IDs, the display setting unit 119 transmits, to the electronic shelf label 102 being related to the abnormality, a control signal that prohibits display. Thereby, the display setting unit 119 prohibits display on the electronic shelf label 102 being related to the abnormality.

<Functional Configuration of Terminal Apparatus 104>

FIG. 1 is referred to.

The terminal apparatus 104 is a terminal apparatus utilized by a user, and is, for example, a tablet terminal, a smartphone, a POS terminal, or the like. When the terminal apparatus 104 receives error information from the output unit 118, the terminal apparatus 104 displays the error information.

So far, the functional configuration of the management system 100 has been mainly described. From now on, physical configuration examples of the management apparatus 103, the electronic shelf label 102, and the terminal apparatus 104 included in the management system 100 are described with reference to the drawings.

<Physical Configuration Example of Management Apparatus 103>

Figure 4:
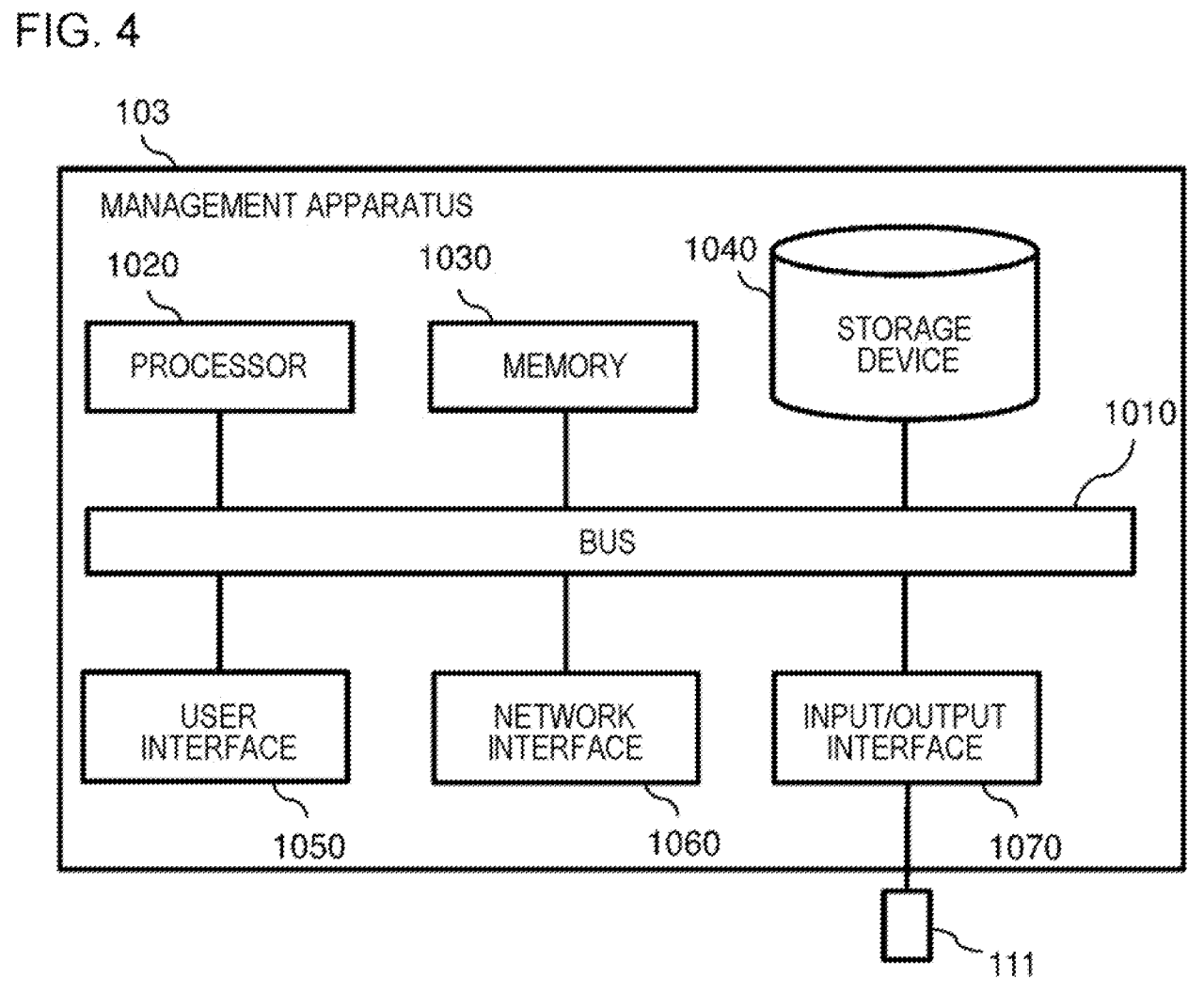

The management apparatus 103 is physically, for example, a general-purpose personal computer, a POS management apparatus, or the like, and, as illustrated in FIG. 4, includes a bus 1010, a processor 1020, a memory 1030, a storage device 1040, a user interface 1050, a network interface 1060, and an input/output interface 1070.

The bus 1010 is a data transmission path through which the processor 1020, the memory 1030, the storage device 1040, the user interface 1050, the network interface 1060, and the input/output interface 1070 transmit/receive data to/from one another. However, a method of mutually connecting the processor 1020 and the like is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores a program module for achieving each function of the management apparatus 103. The processor 1020 reads each of the program modules onto the memory 1030, executes the read program module, and thereby achieves each functional unit being relevant to the program module.

The communication interface 1050 is an interface for communicating with operated equipment 101.

The user interface 1050 is equipment or an apparatus for a user to perform input/output, includes, for example, a keyboard, a mouse, a touch sensor, and the like as input equipment, and includes, for example, a liquid crystal panel and the like as output equipment. The liquid crystal panel is one example of a display apparatus.

The network interface 1060 is an interface for the management apparatus 103 to transmit and receive information by communication.

The input/output interface 1070 is an interface for transmitting and receiving information to and from another piece of equipment such as a scanner as the reading unit 111.

<Physical Configuration Example of Electronic Shelf Label 102>

The electronic shelf label 102 physically includes, for example, a bus 1110, a processor 1120, a memory 1130, a storage device 1140, a network interface 1150, and a display device 1160, as illustrated in FIG. 5.

The bus 1110 is a data transmission path through which the processor 1120, the memory 1130, the storage device 1140, the network interface 1150, and the display device 1160 transmit/receive data to/from one another. However, a method of mutually connecting the processor 1120 and the like is not limited to bus connection.

The processor 1120 is a processor achieved by a CPU, a GPU, or the like. The memory 1130 is a main storage apparatus achieved by a RAM or the like.

The storage device 1140 is an auxiliary storage apparatus achieved by an SSD, a memory card, a ROM, or the like. The storage device 1140 stores a program module for achieving each function of the electronic shelf label 102. The processor 1120 reads each of the program modules onto the memory 1130, executes the read program module, and thereby achieves each functional unit being relevant to the program module.

The network interface 1150 is an interface for the electronic shelf label 102 to transmit and receive information by communication.

The display device 1160 is a device for displaying information, such as a liquid crystal panel.

<Physical Configuration Example of Terminal Apparatus 104>

Figure 6:
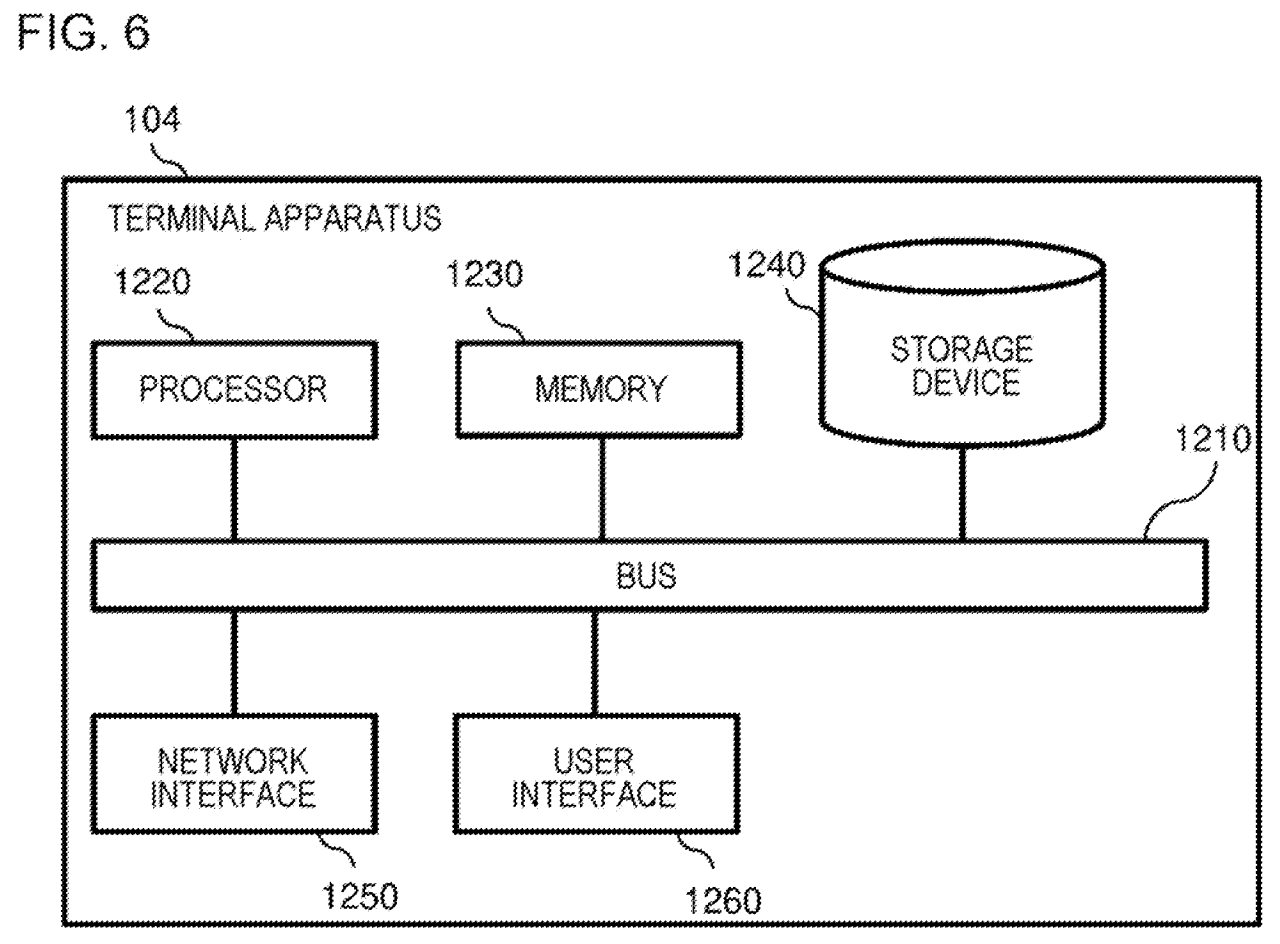

The terminal apparatus 104 is physically, for example, a tablet terminal, a smartphone, a POS terminal, or the like, and, as illustrated in FIG. 6, includes a bus 1210, a processor 1220, a memory 1230, a storage device 1240, a network interface 1250, and a user interface 1260.

The bus 1210 is a data transmission path through which the processor 1220, the memory 1230, the storage device 1240, the network interface 1250, and the display device 1260 transmit/receive data to/from one another. However, a method of mutually connecting the processors 1220 and the like is not limited to bus connection.

The processor 1220 is a processor achieved by a CPU, a GPU, or the like. The memory 1230 is a main storage apparatus achieved by a RAM or the like.

The storage device 1240 is an auxiliary storage apparatus achieved by an SSD, a memory card, a ROM, or the like.

The storage device 1240 stores a program module for achieving each function of the terminal apparatus 104. The processor 1220 reads each of the program modules onto the memory 1230, executes the read program module, and thereby achieves each functional unit being relevant to the program module.

The network interface 1250 is an interface for the terminal apparatus 104 to transmit and receive information by communication.

The user interface 1250 is equipment or an apparatus for a user to perform input/output, includes, for example, a keyboard, a mouse, a touch sensor, and the like as input equipment, and includes, for example, a liquid crystal panel and the like as output equipment.

So far, the functional and physical configurations of the management system 100 have been described. From now on, each of a registration method and a management method is described as an operation in the management system 100 with reference to the drawings.

<Registration Method>

Figure 7:
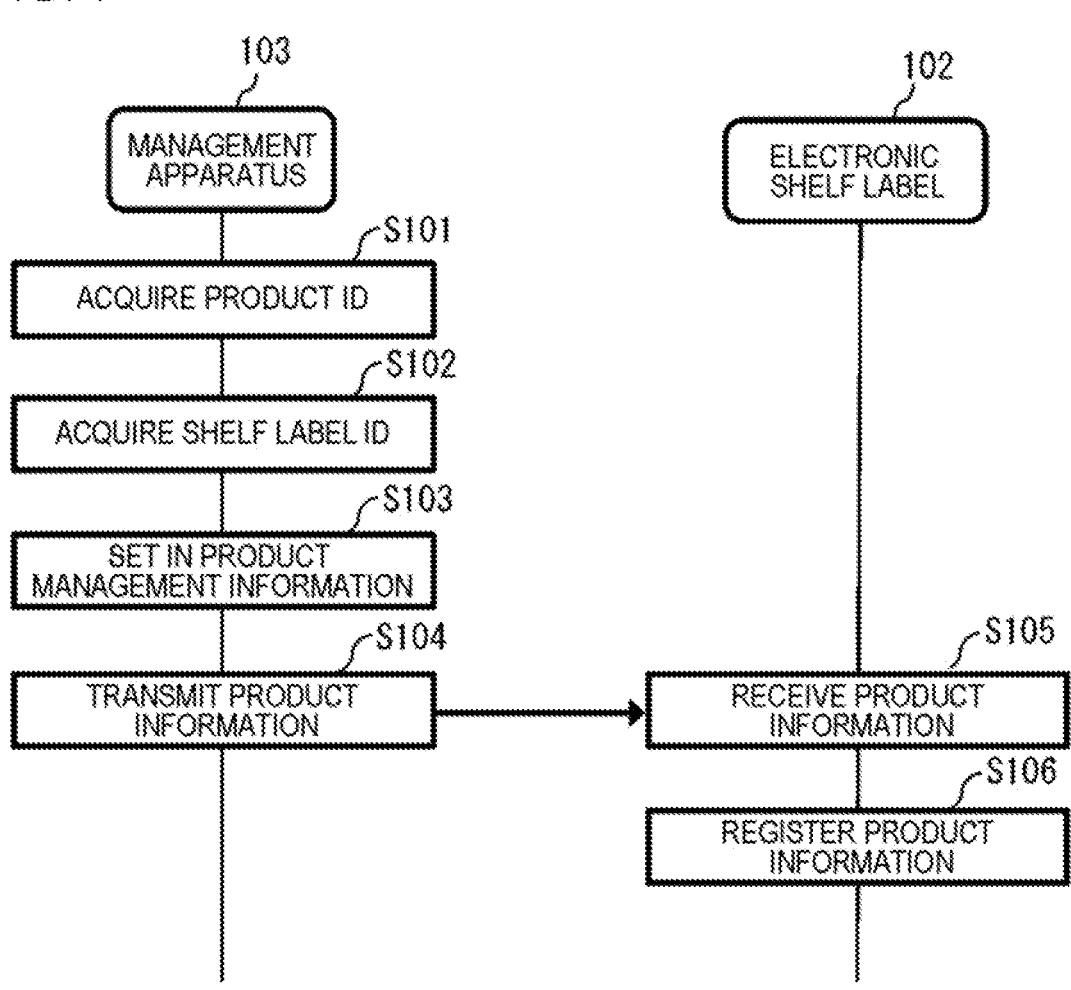
FIG. 7 is a flowchart illustrating one example of a registration method according to one example embodiment of the present invention.

The registration method is a method for registering the plurality of electronic shelf labels 102 and the plurality of products 101 in association with each other, and one example of a flowchart is illustrated in FIG. 7. The registration method is started in a state where a previously determined program is activated by the management apparatus 103, and power of the electronic shelf label 102 is turned on. The registration method is performed, for example, in a backyard or the like of a store where the management apparatus 103 is installed.

Herein, description is given by an example in which, as an initial state before the registration method is executed, product information other than a shelf label ID is registered in product management information 120a of the product storage unit 113 for each of the products 101, but no shelf label ID is set, as illustrated in FIG. 8. Moreover, in an initial state, it is assumed that no shelf label product information is set in the shelf label product storage unit 106 of each of all the electronic shelf labels 102.

Note that, one or both of the shelf label ID and the shelf label product information of the product management information 120a are already registered, and may be updated by a registration method described below.

The management registration unit 112 acquires a product ID (step S101).

Specifically, a user holds the reading unit 111 over, for example, a code provided in the product 101, and thereby reads the code. Read information acquired thereby is transmitted from the reading unit 111 to the management registration unit 112, and the management registration unit 112 acquires a product ID, based on the received read information.

The management registration unit 112 acquires a shelf label ID (step S102).

Specifically, a user holds the reading unit 111 over, for example, a code provided on the electronic shelf label 102, and thereby reads the code. Read information acquired thereby is transmitted from the reading unit 111 to the management registration unit 112, and the management registration unit 112 acquires a shelf label ID, based on the received read information.

Note that, one or both of the product ID and the shelf label ID may be acquired in the management registration unit 112 not by the reading unit 111 but by manual inputting to, for example, a keyboard or the like by a user.

The management registration unit 112 sets, in the product management information 120a, the product ID and the shelf label ID acquired in each of steps S101 and S102 (step S103).

Specifically, the shelf label ID acquired in step S102 is set in the product management information 120a in association with the product ID acquired in step S101.

The management registration unit 112 transmits the product information to the electronic shelf label 102 (step S104).

Specifically, the management registration unit 112 transmits the product information being related to the product ID acquired in step S101 in the product management information 120a, to the electronic shelf label 102 being relevant to the shelf label ID acquired in step S102. In this instance, product information to be transmitted is product identification information, a product name, and a price included in the product management information 120a in relation to the product ID.

Note that, the product information transmitted in step S104 may include at least product identification information among pieces of product information included in the product management information 120a in relation to the product ID, and may be, for example, all of the product information, or a previously determined part of the product information.

The management registration unit 112 transmits the product information to the electronic shelf label 102 (step S104). Thereby, the management apparatus 103 ends the registration method relating to the one product 101.

The shelf label registration unit 105 receives the product information transmitted in step S104 (step S105).

The shelf label registration unit 105 stores the product information received in step S105 in the shelf label product storage unit 106, and thereby registers the product information (step S106). Thereby, the electronic shelf label 102 ends the registration method relating to the one product 101.

When such a registration method is repeatedly and correctly performed regarding each of a combination of the product 101a and the electronic shelf label 102a, a combination of the product 101b and the electronic shelf label 102b, a combination of the product 101c and the electronic shelf label 102c, and a combination of the product 101d and the electronic shelf label 102d, the product management information 120b illustrated in FIG. 9 is stored in the product storage unit 113.

Moreover, each of pieces of shelf label product information 110a_1 to 110d_1 illustrated in FIGS. 10A to 10D is registered in each of the electronic shelf labels 102a to 102d.

Figure 10A:
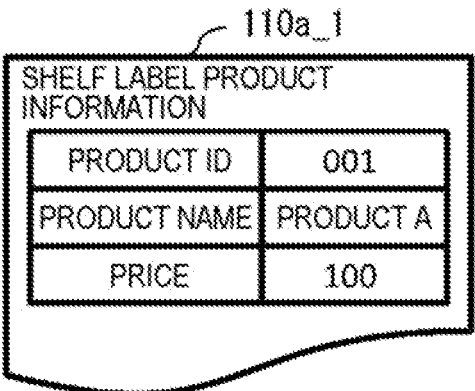
FIG. 10A is a diagram illustrating one example of shelf label product information registered in a first shelf label when a product and a shelf label are correctly associated with each other.
Figure 10B:
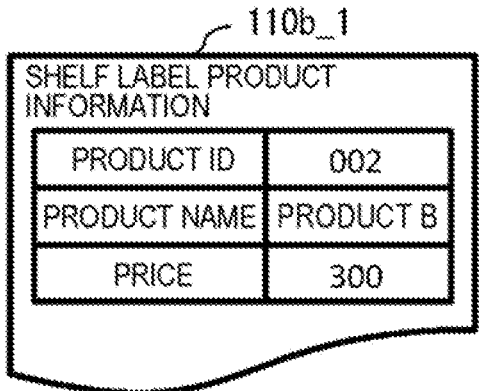
FIG. 10B is a diagram illustrating one example of shelf label product information registered in a second shelf label when a product and a shelf label are correctly associated with each other.

Specifically, the shelf label product information 110a_1 illustrated in FIG. 10A is shelf label product information stored in the shelf label product storage unit 106 when the first product 101a is correctly associated with and registered in the first electronic shelf label 102a according to the present example embodiment. The shelf label product information 110b_1 illustrated in FIG. 10B is shelf label product information stored in the shelf label product storage unit 106 when the second product 101b is correctly associated with and correctly registered in the second electronic shelf label 102b according to the present example embodiment.

Figure 10C:
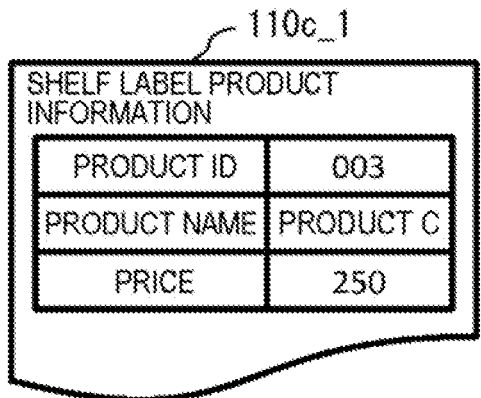
FIG. 10C is a diagram illustrating one example of shelf label product information registered in a third shelf label when a product and a shelf label are correctly associated with each other.
Figure 10D:
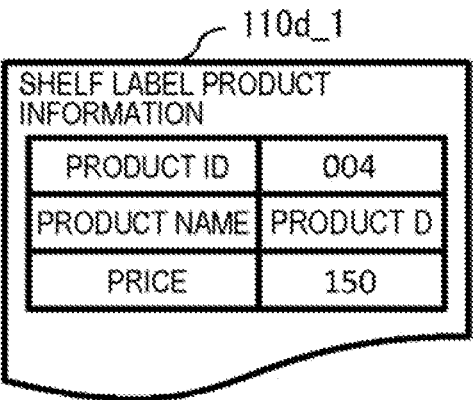
FIG. 10D is a diagram illustrating one example of shelf label product information registered in a fourth shelf label when a product and a shelf label are correctly associated with each other.

The shelf label product information 110c_1 illustrated in FIG. 10C is shelf label product information stored in the shelf label product storage unit 106 when the third product 101c is correctly associated with and correctly registered in the third electronic shelf label 102c according to the present example embodiment. The shelf label product information 110d_1 illustrated in FIG. 10D is shelf label product information stored in the shelf label product storage unit 106 when the fourth product 101d is correctly associated with and correctly registered in the fourth electronic shelf label 102*d* according to the present example embodiment.

<Management Method>

Figure 11A:
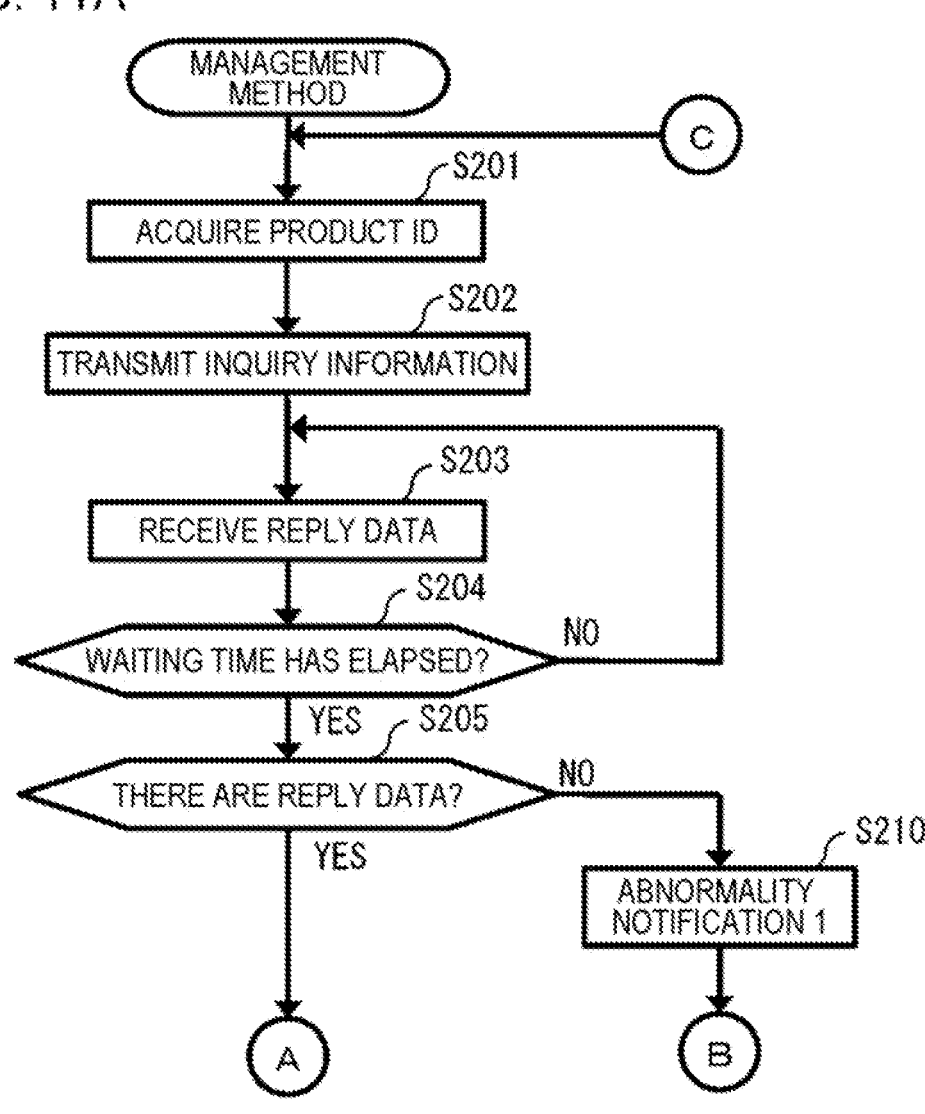
FIG. 11A is a flowchart illustrating one example of a management method according to one example embodiment of the present invention.
Figure 11B:
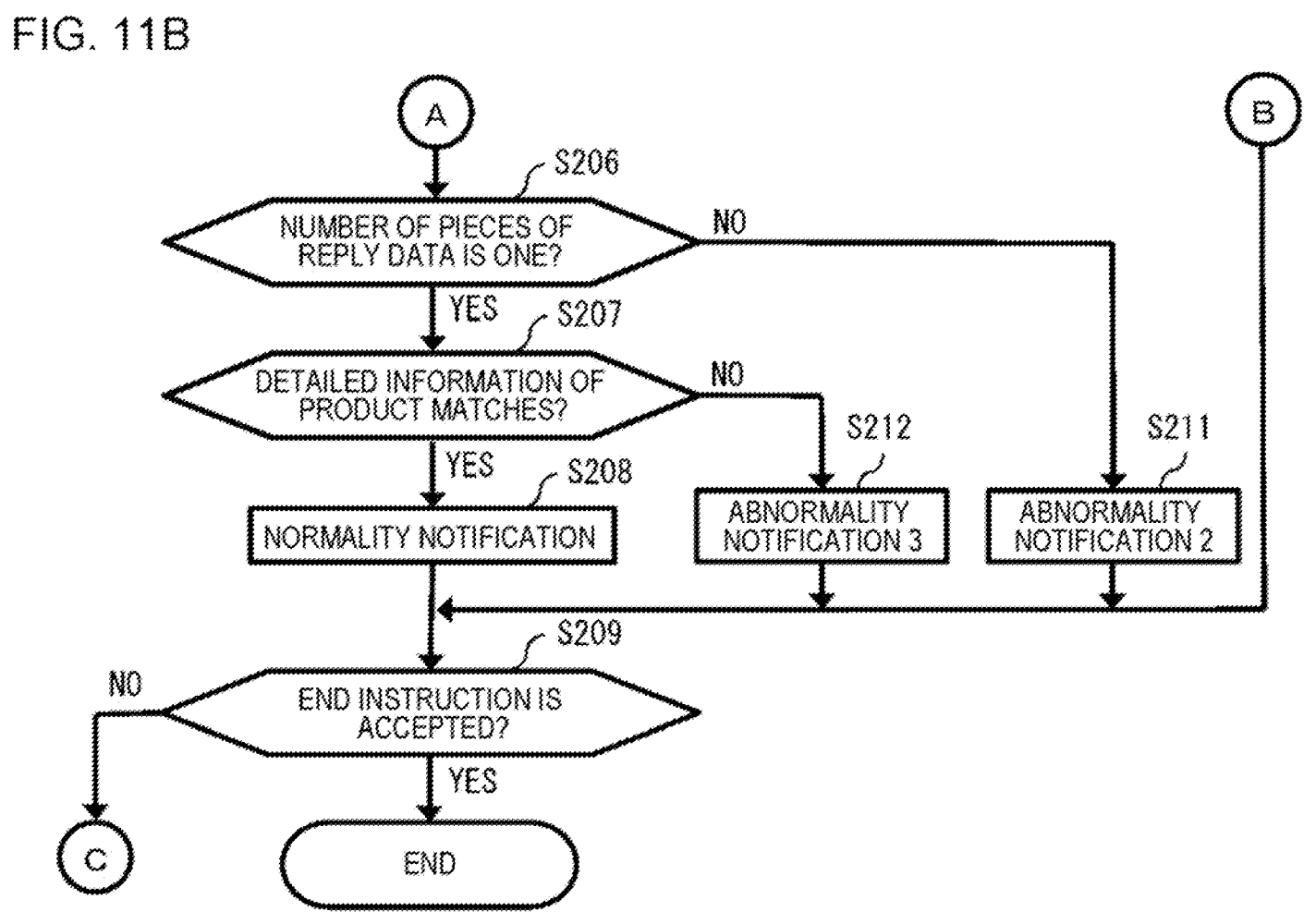

The management method is a method for managing registration of the plurality of electronic shelf labels 102 and the plurality of products 101, and one example of a flowchart is illustrated in FIGS. 11A and 11B. The management method is started in a state where a previously determined program is activated by the management apparatus 103, and power of the electronic shelf label 102 is turned on. The management method is performed, for example, in a back-yard or the like of a store where the management apparatus 103 is installed, following the registration method described above.

FIGS. 9 and 10A to 10D illustrate the examples of the correctly registered product management information 120*b* and pieces of the shelf label product information 110*a*_1 to 110*d*_1. However, actually, the erroneous product management information 120 or shelf label product information 110 may be registered due to a human error or the like.

FIG. 12 is one example of product management information 120*c* including an error. Moreover, FIGS. 13A to 13D illustrate one example of shelf label product information 110*a*_2 to 110*d*_2 when the product management information 120*c* is stored in the management apparatus 103. In each of FIGS. 12 and 13A to 13D, the error is underlined in order that a part being relevant to the error is easily understand.

Specifically, the product management information 120*c* illustrated in FIG. 12 illustrates an example in which a shelf label ID being related to a product with a product ID "002" should be correctly "ESL2" (refer to FIG. 9), but is actually not registered.

Figure 13A:
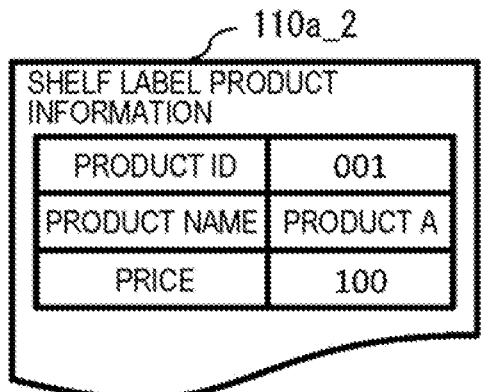
FIG. 13A is a diagram illustrating one example of shelf label product information registered in a first shelf label when the product management information illustrated in FIG. 12 is stored in the management apparatus.
Figure 13B:
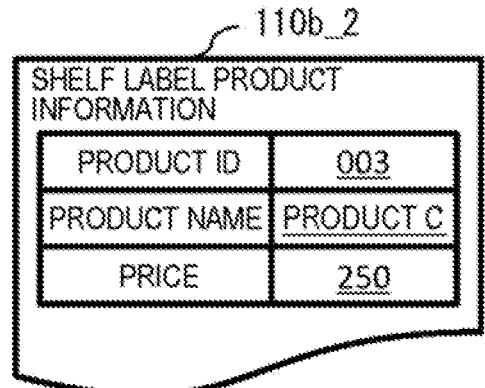
FIG. 13B is a diagram illustrating one example of shelf label product information registered in a second shelf label when the product management information illustrated in FIG. 12 is stored in the management apparatus.

Moreover, FIG. 13A is an example of the shelf label product information 110*a*_2 registered in the first electronic shelf label 102*a*, and a content of the shelf label product information 110*a*_2 is correct. FIG. 13B is an example of the shelf label product information 110*b*_2 registered in the second electronic shelf label 102*b*, and, in the shelf label product information 110*b*_2, product information of a product ID "003" is erroneously registered.

Figure 13C:
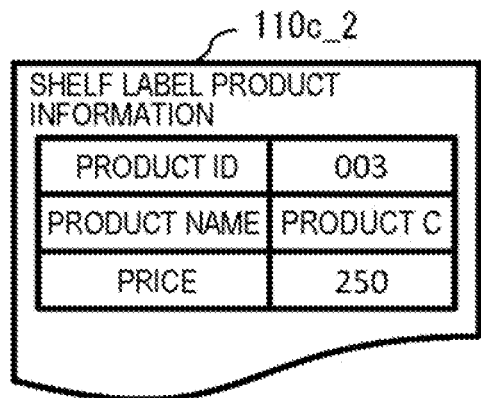
FIG. 13C is a diagram illustrating one example of shelf label product information registered in a third shelf label when the product management information illustrated in FIG. 12 is stored in the management apparatus.
Figure 13D:
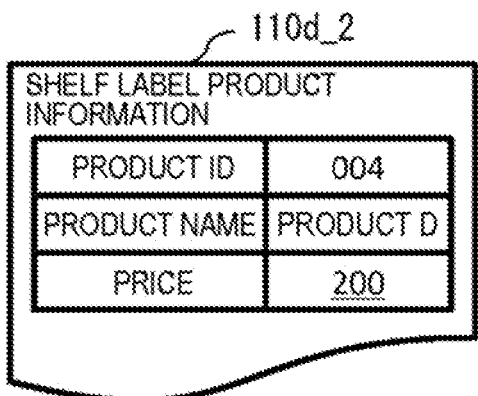
FIG. 13D is a diagram illustrating one example of shelf label product information registered in a fourth shelf label when the product management information illustrated in FIG. 12 is stored in the management apparatus.

FIG. 13C is an example of the shelf label product information 110*c*_2 registered in the third electronic shelf label 102*c*, and a content of the shelf label product information 110*c*_2 is correct. FIG. 13D is an example of the shelf label product information 110*d*_2 registered in the fourth electronic shelf label 102*d*, and, in the shelf label product information 110*d*_2, a product ID "004" is correctly registered, but a price of a product being relevant to the product ID "004" is erroneously registered.

The management method is a management method for easily confirming such an error (abnormality), and is described below with reference to FIGS. 11A and 11B.

FIG. 11A is referred to.

The inquiry unit 114 acquires a product ID (step S201).

Specifically, similarly to step S101 described above, read information acquired by holding, by a user, the reading unit 111 over, for example, a code provided on the product 101 is transmitted from the reading unit 111 to the inquiry unit 114. The inquiry unit 114 acquires the product ID, based on the received read information.

The inquiry unit 114 transmits, to each of the electronic shelf labels 102, inquiry information including the product ID acquired in step S201 (step S202).

Specifically, the inquiry unit 114 transmits, to the electronic shelf label 102, inquiry information including a common electronic ID as first product identification information. Thereby, the inquiry information is received by, for example, the shelf label communication unit 109 of each of the electronic shelf labels 102 within a previously determined range from the management apparatus 103.

The shelf label communication unit 109 refers to the shelf label product information 110 registered in the electronic shelf label 102 including itself, and determines whether the product ID acquired in step S201 is included.

When the product ID is included in the shelf label product information 110, the shelf label communication unit 109 transmits, to the management apparatus 103, reply data including the product information included in the shelf label product information 110. When no product ID is included in the shelf label product information 110, the shelf label communication unit 109 does not transmit reply data. Thereby, the management apparatus 103 receives reply data from the electronic shelf label 102 in which the product ID included in the inquiry information transmitted in step S202 is registered.

The reply receiving unit 115 performs reception of the reply data from the electronic shelf label 102 (step S203).

The reply receiving unit 115 measures an elapsed time since execution of step S202, and thereby determines whether a previously determined waiting time has elapsed since the execution of step S202 (step S204). When the waiting time has not elapsed (step S204; NO), the reply receiving unit 115 continues processing in step S203. Thereby, reception of the reply data is continued until the waiting time elapses.

When the waiting time has elapsed (step S204; YES), the registration confirmation unit 116 determines whether there are reply data received in step S203 (step S205).

When there are reply data (step S205; YES), the registration confirmation unit 116 determines whether the number of pieces of reply data received in step S203 is one, as illustrated in FIG. 11B (step S206).

When the number of pieces of reply data is one (step S206; YES), the registration confirmation unit 116 determines whether detailed information of a product included in the reply data received in step S203 matches the product management information 120*b* (step S207).

Specifically, in step S207, the registration confirmation unit 116 compares the detailed information included in the reply data received in step S203 with detailed information being related to the product ID transmitted in step S201 in the product management information 120*b*. Then, the registration confirmation unit 116 determines, based on a result of the comparison, whether the detailed information matches.

When it is determined that the detailed information of the product matches (step S207; YES), the notification control unit 117 performs control for causing a normality notification to be performed (step S208).

The normality notification is a notification for informing a user that a product being relevant to the product ID transmitted in step S201 is registered without an error.

Specifically, for example, in step S208, the notification control unit 117 causes the electronic shelf label 102 to perform a notification in a previously determined mode as the normality notification. A mode of the notification is, for example, causing the electronic shelf label 102 being a transmission source of the reply data received in step S203 to blink the shelf label display unit 107 in blue for a previously determined time, or the like.

Note that, step S208 may not be performed.

The inquiry unit 114 determines whether an end instruction based on a predetermined operation from a user is accepted (step S209). When it is determined that the end instruction is accepted (step S209; YES), the inquiry unit 114 ends the management method. When it is determined that the end instruction is not accepted (step S209; NO), the inquiry unit 114 again executes step S201 illustrated in FIG. 11A.

When there are no reply data (step S205; NO), the electronic shelf label 102 in which the product ID included in the inquiry information transmitted in step S202 is registered does not exist. In other words, a product being relevant to the registration ID cannot be registered in the electronic shelf label 102.

Thus, when it is determined that there are no reply data (step S205; NO), the notification control unit 117 performs control for causing an abnormality notification 1 to be performed (step S210).

The abnormality notification 1 is a notification for informing a user that there is no registered electronic shelf label 102, regarding a product being relevant to the product ID transmitted in step S201.

Specifically, for example, in step S210, the notification control unit 117 causes the electronic shelf label 102 to perform a notification in a previously determined mode as the abnormality notification 1. A mode of the notification is, for example, blinking the shelf label display units 107 of all the electronic shelf labels 102 in red for a previously determined time, or the like.

The inquiry unit 114 executes determination processing in step S209, for example, when a previously determined time for the abnormality notification 1 elapses.

When the number of pieces of reply data is not one (step S206; NO), the plurality of electronic shelf labels 102 in which the product ID included in the inquiry information transmitted in step S202 is registered exist. In other words, in the present example embodiment, a product and the electronic shelf label 102 should be associated with each other on a one-to-one basis, but one product is registered in the plurality of electronic shelf labels 102.

Thus, when it is determined that the number of pieces of reply data is not one (step S206; NO), the notification control unit 117 performs control for causing an abnormality notification 2 to be performed (step S211).

The abnormality notification 2 is a notification for informing a user that the plurality of electronic shelf labels 102 are registered for a product being relevant to the product ID transmitted in step S201.

Specifically, for example, in step S211, the notification control unit 117 causes the electronic shelf label 102 to perform a notification in a previously determined mode as the abnormality notification 2. A mode of the notification is, for example, causing all of the plurality of electronic shelf labels 102 being transmission sources of the reply data received in step S203 to blink the shelf label display unit 107 in red for a previously determined time, or the like.

The inquiry unit 114 executes the determination processing in step S209, for example, when a previously determined time for the abnormality notification 2 elapses.

When the detailed information of the product does not match (step S207; NO), detailed information of a product being relevant to the product ID included in the inquiry information transmitted in step S202 is erroneously registered in the electronic shelf label 102.

Thus, when it is determined that the detailed information of the product does not match (step S207; NO), the notification control unit 117 performs control for causing an abnormality notification 3 to be performed (step S212).

The abnormality notification 3 is a notification for informing a user that erroneous detailed information is registered in the associated electronic shelf label 102, regarding a product being relevant to the product ID transmitted in step S201.

Specifically, for example, in step S212, the notification control unit 117 causes the electronic shelf label 102 to perform a notification in a previously determined mode as the abnormality notification 3. A mode of the notification is, for example, causing the electronic shelf label 102 being a transmission source of the reply data received in step S203 to blink the shelf label display unit 107 in red for a previously determined time, or the like.

The inquiry unit 114 executes the determination processing in step S209, for example, when a previously determined time for the abnormality notification 3 elapses.

Note that, modes of a normality notification and the abnormality notifications 1 to 3 are not limited to the modes exemplified herein, and may differ in, for example, a blinking color and a time interval. Moreover, the example in which a notification is performed by the electronic shelf label 102 has been described in the present example embodiment, but a notification may be performed by display on a display unit of the management apparatus 103, or the like.

It is assumed that the product management information 120c illustrated in FIG. 12 described above is stored in the management apparatus 103, and each piece of the shelf label product information 110a_2 to 110d_2 in FIGS. 13A to 13D is registered in each of the first to fourth electronic shelf labels 102a to 102d.

First, it is assumed that, in step S201, a product ID is read regarding the first product 101a with a product ID "001". In this case, as recognized with reference to FIGS. 13A to 13D, the first product 101a is correctly registered in the first electronic shelf label 102a having an electronic shelf label ID "ESL1". Thus, it is determined, based on reply data received in step S203, that there are the reply data in each of steps S205 and S206, the number of pieces of the reply data is one, and detailed information of the product matches. As a result, the normality notification is performed in step S208.

Thereby, a user can recognize that the first product 101a has been correctly associated with and registered in the first electronic shelf label 102a.

Subsequently, it is assumed that, in step S201, a product ID is read regarding the second product 101b with a product ID "002". In this case, as recognized with reference to FIGS. 13A to 13D, since no electronic shelf label 102 is associated with the second product 101b, the reply receiving unit 115 does not receive reply data in step S203. Thus, in step S205, it is determined that there are no reply data (step S205; NO), and the abnormality notification 1 is performed in step S210.

Thereby, a user can recognize that there is an abnormality in which the second product 101b has not been registered in any of the electronic shelf labels 102a to 102d.

Subsequently, it is assumed that, in step S201, a product ID is read regarding the third product 101c with a product ID "003". In this case, as recognized with reference to FIGS. 13A to 13D, since the third product 101c is associated with the plurality of electronic shelf labels 102b and 102c, the reply receiving unit 115 receives a plurality of pieces of reply data in step S203. Thus, in step S206, it is determined that the number of pieces of reply data is not one (step S206; NO), and the abnormality notification 2 is performed in step S211.

Thereby, a user can recognize that there is an abnormality in which the third product 101c has been registered in the plurality of electronic shelf labels 102b and 102c.

Subsequently, it is assumed that, in step S201, a product ID is read regarding the fourth product 101d with a product ID "004". In this case, as recognized with reference to FIGS. 13A to 13D, the fourth product 101d is registered in the fourth electronic shelf label 101d. However, a price included in the shelf label product information 110d_2 of the fourth electronic shelf label 101d differs from a price being related to the product ID "004" in the product management information 112c.

Thus, in step S207, it is determined that detailed information of the product does not match (step S207; NO), and the abnormality notification 3 is performed in step S212.

Thereby, a user can recognize that there is an abnormality in which erroneous detailed information has been registered in the fourth electronic shelf label 102d regarding the fourth product 101d.

In a series of processing relating to the products 101a to 101d described herein, the products 101 being related to an abnormality are the three products 101b to 101d. Thus, the output unit 118 generates error information including the products 101b to 101d, and outputs the generated error information to the terminal apparatus 104. Thereby, since the error information is displayed on the terminal apparatus 104, a user can easily recognize that products being related to the abnormality are the products 101b to 101d.

Moreover, in a series of processing relating to the products 101a to 101d described herein, there is an abnormality in the reply data from the electronic shelf labels 102b to 102d. Thus, the display setting unit 119 transmits, to each of the electronic shelf labels 102b to 102d, a control signal that prohibits display. Thereby, the display setting unit 119 prohibits display on the electronic shelf label 102 being related to the abnormality.

According to the present example embodiment, control is performed for transmitting inquiry information including product identification information of a certain product to the plurality of electronic shelf labels 102, and notifying a user, based on reply data from the plurality of electronic shelf labels 102 in response to the inquiry. Thereby, it is possible to automatically confirm, based on the reply data from the plurality of electronic shelf labels 102, whether the certain product is correctly registered in the plurality of electronic shelf labels 102. Therefore, it becomes possible to reduce a burden on a user when confirming whether product information is correctly registered in the electronic shelf label 102.

Although one example embodiment of the present invention has been described so far, the present invention is not limited to the example embodiment.

For example, the shelf label product information 110 may include at least product identification information as product information. Detailed information included in the shelf label product information 110 may be all detailed information included in the product management information 120 described later, or may be a previously determined part of detailed information.

For example, when the electronic shelf label 102 has a light emitting unit such as a light emitting diode (LED), a speaker that sounds a buzzer, and a vibration unit that causes to vibrate, a notification may be performed by lighting or blinking of the light emitting unit, a buzzer, vibration, or the like.

For example, an output destination of the output unit 118 is not limited to the terminal apparatus 104, and may be another apparatus, such as a display apparatus such as a liquid crystal panel included in the management apparatus 103.

Further, although a plurality of processes (pieces of processing) are described in order in a diagram illustrating a flow used in the above description, an execution order of the processes is not limited to the described order. An order of the processes may be changed to an extent that causes no problem in terms of content. Moreover, the one example embodiment and modified example described above may be combined to an extent that content does not contradict.

One or all means of the above-described example embodiments can also be described as, but are not limited to, the following supplementary notes.

1. A management apparatus including:

an inquiry means for transmitting inquiry information including first product identification information to a plurality of electronic shelf labels; and a notification control means for performing control for notifying a user, based on reply data from the plurality of electronic shelf labels in response to the inquiry information.

2. The management apparatus according to supplementary note 1, wherein the notification control means performs control for issuing a warning to the user when there is an abnormality in the reply data.

3. The management apparatus according to supplementary note 2, wherein the abnormality is that reply data indicating that the first product identification information is registered are received from the plurality of electronic shelf labels.

4. The management apparatus according to supplementary note 2, wherein the abnormality is that reply data indicating that the first product identification information is registered are not received from the plurality of electronic shelf labels.

5. The management apparatus according to supplementary note 2, further including a product storage means for storing product management information associating the first product identification information with detailed information, wherein the reply data include detailed information relating to a product being relevant to the first product identification information, and the abnormality is that detailed information included in the reply data includes information that does not match detailed information being related to the product identification information in the product management information.

6. The management apparatus according to supplementary note 2, further including an output means for outputting to another apparatus, wherein the inquiry means further inquires of each of the plurality of electronic shelf labels about at least one piece of the product identification information differing from the first product identification information, and the output means outputs error information indicating the product being related to the abnormality, when the abnormality is present regarding any piece of the product identification information.

7. The management apparatus according to supplementary note 2, further including a display setting means for performing setting relating to display on the electronic shelf label, wherein the display setting means prohibits the display on the electronic shelf label being related to the abnormality.

8. A management system including:

a plurality of electronic shelf labels with each of which a product is associated; and a management apparatus that manages the plurality of electronic shelf labels, wherein the management apparatus includes an inquiry means for transmitting inquiry information including first product identification information to a plurality of electronic shelf labels, and a notification control unit that performs control for notifying a user, based on reply data from the plurality of electronic shelf labels in response to the inquiry information, and each of the plurality of electronic shelf labels includes a shelf label product storage means for storing product identification information of a product to be associated, and a shelf label communication means for transmitting reply data when the inquiry information is received.

9. A management method including:

transmitting inquiry information including first product identification information to a plurality of electronic shelf labels; and performing control for notifying a user, based on reply data from the plurality of electronic shelf labels in response to the inquiry information.

10. A program for causing a computer to execute:

transmitting inquiry information including first product identification information to a plurality of electronic shelf labels; and performing control for notifying a user, based on reply data from the plurality of electronic shelf labels in response to the inquiry information.

REFERENCE SIGNS LIST

100 Management system
101, 101a to 101d Product
102, 102a to 102d Electronic shelf label
103 Management apparatus
104 Terminal apparatus
105 Shelf label registration unit
106 Shelf label product storage unit
107 Shelf label display unit
108 Shelf label display control unit
109 Shelf label communication unit
110 Shelf label product information
111 Reading unit
112 Management registration unit
113 Product storage unit
114 Inquiry unit
115 Reply receiving unit
116 Registration confirmation unit
117 Notification control unit
118 Output unit
119 Display setting unit
120 Product management information

What is claimed is:

1. A management apparatus comprising:

at least one memory configured to store instructions; and at least one processor configured to execute the instructions to perform operations comprising:

storing product management information associating first product identification information with first detailed information;

transmitting inquiry information including the first product identification information to a plurality of electronic shelf labels; and performing a control operation to notify a user, based on reply data from the plurality of electronic shelf labels in response to the inquiry information, wherein the performing the control operation to notify the user comprises:

obtaining the reply data, which comprises second detailed information relating to a product relevant to the first product identification information, identifying an abnormality in the reply data based on a determination that the second detailed information included in the reply data does not match the first detailed information related to the first product identification information in the product management information, and controlling an electronic shelf label, which transmitted the reply data including the abnormality, among the plurality of electronic shelf labels, to change a color of display of the electronic shelf label or alternate between displaying and not displaying information on the electronic shelf label, and wherein the abnormality in the reply data in response to the inquiry information is further identified based on a single product being registered in multiple electronic shelf labels among the plurality of electronic shelf labels.

2. A management system comprising:

a plurality of electronic shelf labels, each associated with a product; and a management apparatus that manages the plurality of electronic shelf labels, wherein the management apparatus comprises:

at least one memory configured to store instructions; and at least one processor configured to execute the instructions to perform operations comprising:

storing product management information associating first product identification information with first detailed information;

transmitting inquiry information including the first product identification information to the plurality of electronic shelf labels, and performing a control operation to notify a user, based on reply data from the plurality of electronic shelf labels in response to the inquiry information, wherein the performing the control operation to notify the user comprises:

obtaining the reply data, which comprises second detailed information relating to a product relevant to the first product identification information, identifying an abnormality in the reply data based on a determination that the second detailed information included in the reply data does not match the first detailed information related to the first product identification information in the product management information, and controlling an electronic shelf label, which transmitted the reply data including the abnormality, among the plurality of electronic shelf labels, to change a color of display of the electronic shelf label or alternate between displaying and not displaying information on the electronic shelf label, and each of the plurality of electronic shelf labels comprises:

at least one memory configured to store instructions; and at least one processor configured to execute the instructions to perform operations comprising:

transmitting the reply data when the inquiry information is received, wherein the abnormality in the reply data in response to the inquiry information is further identified based on a single product being registered in multiple electronic shelf labels among the plurality of electronic shelf labels.

3. A management method comprising:

storing product management information associating first product identification information with first detailed information;

transmitting inquiry information including the first product identification information to a plurality of electronic shelf labels; and performing a control operation to notify a user, based on reply data from the plurality of electronic shelf labels in response to the inquiry information, wherein the performing the control operation to notify the user comprises:

obtaining the reply data, which comprises second detailed information relating to a product relevant to the first product identification information, identifying an abnormality in the reply data based on a determination that the second detailed information included in the reply data does not match the first detailed information related to the first product identification information in the product management information, and controlling an electronic shelf label, which transmitted the reply data including the abnormality, among the plurality of electronic shelf labels, to change a color of display of the electronic shelf label or alternate between displaying and not displaying information on the electronic shelf label, and wherein the abnormality in the reply data in response to the inquiry information is further identified based on a single product being registered in multiple electronic shelf labels among the plurality of electronic shelf labels.

4. The management apparatus of claim 1, wherein the method further comprises performing a control operation to display a warning on the electronic shelf label which transmitted the reply data including the abnormality by changing the color of display of the electronic shelf label which transmitted the reply data including the abnormality.

5. The management apparatus of claim 1, wherein the method further comprises performing a control operation to display a warning on the electronic shelf label which transmitted the reply data including the abnormality by blinking the information displayed on the electronic shelf label which transmitted the reply data including the abnormality.

* * * * *